UNITED STATES PATENT OFFICE.

CHARLES G. PENDLETON, OF NEW YORK, N. Y.

SOLUTION FOR NICKEL-PLATING.

SPECIFICATION forming part of Letters Patent No. 232,615, dated September 28, 1880.

Application filed October 4, 1879.

*To all whom it may concern:*

Be it known that I, CHARLES G. PENDLETON, of the city, county, and State of New York, have invented a new and useful Improvement in Nickel-Plating Solutions, of which the following is a full, clear, and accurate description.

The object of my invention relates to a new and improved process of preparing solutions of oxide of nickel and acetic acid for nickel-plating purposes.

I am aware that solutions of oxide of nickel and acetic acid have been used to some extent in nickel-plating; but these solutions have not hitherto been so successful as to give satisfactory results, the work plated in them being imperfect, ununiform, and often covered with a deposit of black oxide of nickel.

I have discovered the causes of these difficulties and the method by which they can be obviated. These difficulties in the preparation and use of solutions of oxide of nickel and acetic acid may arise from the impurities of the materials used, the cure of which is obvious to all, but are principally due to two facts—first, that when acetic acid is added to oxide of nickel the chemical changes taking place between the constituent parts of these materials require some time, and if, as is now the practice in making said solutions, water is added to the combined acid and nickel before the chemical changes have fully taken place chemical action is delayed and continues slowly during the use of the solution in plating; second, that this class of solutions—that is, acetate-of-nickel solutions—require to be prepared with an excess of acid and to be kept markedly acid while in use; otherwise the solution will not give satisfactory results.

I prepare my solution as follows: I prefer to make it in quantities of fifty gallons, as this is a proper quantity for ordinary tanks used in nickel-plating, though either great or less quantities may be prepared at one time, if desired.

To prepare fifty gallons of said solution I take about twenty pounds of oxide of nickel and add to it about ten gallons of acetic acid. I then allow this mixture of oxide of nickel and acetic acid to stand for such length of time that the gases generated by their chemical action are thoroughly evolved and pass off. In preparing said solution I would recommend that at least twenty-four hours should be allowed to elapse before adding the water to the mixture. The mixture of oxide of nickel and acetic acid may be placed on a stove or sand-bath for the purpose of hastening the chemical changes in the mixture by heating it. After allowing the mixture to stand for such length of time as to allow the gases to pass off the water is added, and the solution is then ready for use.

In preparing solutions of greater or less quantities than fifty gallons, the quantities of oxide of nickel and acetic acid are, of course, varied; but the same relative proportions are preserved between them.

Great care should be taken in the preparation and use of this solution that it shall contain at all times an excess of acetic acid, and if in making and testing it the solution is found not to have an acid reaction, sufficient acetic acid should be added to produce a markedly acid reaction.

These solutions thus prepared and used do not become depleted in using, and require no addition of nickel to keep up their strength other than that derived from the nickel of the anode.

As no materials are used in the preparation of these solutions but oxide of nickel and acetic acid, they are free from sulphates and chlorides of nickel and any of the compounds of ammonium and any other salts.

Having thus described my invention, what I claim, and desire to secure by Letters Patent, is—

1. In the art of nickel-plating, an acid solution of acetate of nickel, consisting of oxide of nickel and acetic acid, said solution having an excess of acid.

2. The method of making acid solutions of acetate of nickel, consisting in slowly digesting oxide of nickel and acetic acid with or without heat, so as to have an excess of acid in the solution, substantially as described.

In testimony whereof I have hereunto set my hand this 2d day of October, 1879.

C. G. PENDLETON.

In presence of—
CHARLES G. COE,
R. T. VAN BOSKERCK.